United States Patent
Lei et al.

(10) Patent No.: US 11,626,016 B2
(45) Date of Patent: Apr. 11, 2023

(54) SYSTEMS AND METHODS OF VEHICULAR OPERATION

(71) Applicant: Ford Global Technologies, LLC, Dearborn, MI (US)

(72) Inventors: Oliver Lei, Windsor (CA); Perry MacNeille, Lathrup Village, MI (US); Ayush Shah, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 16/355,260

(22) Filed: Mar. 15, 2019

(65) Prior Publication Data
US 2020/0294397 A1   Sep. 17, 2020

(51) Int. Cl.
| G08G 1/0967 | (2006.01) |
| B60Q 9/00 | (2006.01) |
| B60W 30/09 | (2012.01) |
| G08G 1/09 | (2006.01) |

(52) U.S. Cl.
CPC ....... *G08G 1/096725* (2013.01); *B60Q 9/008* (2013.01); *B60W 30/09* (2013.01); *G08G 1/091* (2013.01); *B60W 2300/105* (2013.01); *B60W 2556/65* (2020.02); *B60Y 2200/116* (2013.01)

(58) Field of Classification Search
CPC .. G08G 1/096725; G08G 1/091; B60Q 9/008; B60W 30/09; B60W 2556/65; B60W 2300/105; B60Y 2200/116
See application file for complete search history.

(56) References Cited

U.S. PATENT DOCUMENTS

| 5,493,291 A | 2/1996 | Bruggermann |
| 11,055,991 B1 * | 7/2021 | Mulligan ............... G08G 1/095 |
| 2011/0035140 A1 | 2/2011 | Candy |
| 2016/0036917 A1 | 2/2016 | Koravadi et al. |
| 2016/0231746 A1 * | 8/2016 | Hazelton .............. G05D 1/0274 |
| 2017/0039850 A1 | 2/2017 | Vanden Berg et al. |
| 2017/0190336 A1 * | 7/2017 | Vijayan ................ G05D 1/0088 |

(Continued)

FOREIGN PATENT DOCUMENTS

| EP | 3536574 A1 * | 6/2018 | .......... B60W 40/068 |
| EP | 3536574 A1 * | 9/2019 | .............. B60T 8/172 |

(Continued)

OTHER PUBLICATIONS

Ibáñez, Álvaro, "Smart Pavement Working in the Real World", Feb. 2, 2019, Design and Engineering Ferrovial Blog (Year: 2019).*

(Continued)

*Primary Examiner* — Russell Frejd
*Assistant Examiner* — Ana D Thomas
(74) *Attorney, Agent, or Firm* — Joseph Zane; Eversheds Sutherland (US) LLP (57) ABSTRACT

A method is disclosed for vehicular operation on a road comprising a road network configured to communicate with one or more vehicles on the road, the method comprising sending a signal from a first vehicle to the road network, the signal comprising an intended path of the first vehicle on the road; receiving the signal at the road network; and adjusting at least one of a speed and a path of a second vehicle with respect to the road in response to the signal.

17 Claims, 4 Drawing Sheets

(56) References Cited

U.S. PATENT DOCUMENTS

| | | | | |
|---|---|---|---|---|
| 2017/0236412 A1* | 8/2017 | Gross | ............... | G08G 1/0965 |
| | | | | 701/301 |
| 2018/0259976 A1* | 9/2018 | Williams | ............. | G01C 21/005 |

FOREIGN PATENT DOCUMENTS

| | | | | |
|---|---|---|---|---|
| JP | 2019-784457 | * | 6/2018 | .......... B60W 40/068 |
| WO | WO-2019784457 A2 | * | 6/2018 | .......... B60W 40/068 |

OTHER PUBLICATIONS

Martinez, Francisco J., et al. "Emergency services in future intelligent transportation systems based on vehicular communication networks." IEEE Intelligent Transportation Systems Magazine 2.2 (2010): 6-20. (Year: 2010).*

Tewolde, Girma S. "Sensor and network technology for intelligent transportation systems." 2012 IEEE International Conference on Electro/Information Technology. IEEE, 2012. (Year: 2012).*

Han, Baoguo, et al. "Integration and road tests of a self-sensing CNT concrete pavement system for traffic detection." Smart Materials and Structures 22.1 (2012): 015020. (Year: 2012).*

Xiao, Jian, Xiang Zou, and Wenyao Xu. "ePave: A self-powered wireless sensor for smart and autonomous pavement." Sensors 17.10 (2017): 2207. (Year: 2017).*

Tangermann, Victor. "This is How Intelligent Smart Roads Could Become." Sensors 17.10 (2017): 2207. (Year: 2007).*

Chavan, Shilpa S., R. S. Deshpande, and J. G. Rana. "Design of intelligent traffic light controller using embedded system." 2009 Second International Conference on Emerging Trends in Engineering & Technology. IEEE, 2009. (Year: 2009).*

Younis, Ossama, and Nader Moayeri. "Employing cyber-physical systems: Dynamic traffic light control at road intersections." IEEE Internet of Things Journal 4.6 (2017): 2286-2296. (Year: 2017).*

Integrated Roadways Say Hello to the Real Information Super Highway (8 pages). Retrieved from http://integratedroadways.com/.

Stone, T., "WSP designing roadway to be used in Colorado's 'smart pavement' technology pilot," Jul. 13, 2018 (3 pages). Retrieved from http://www.traffictechnologytoday.com/news.php?NewsID=92157.

Abate, T., "Stanford engineers aim to connect the world with ant-sized radios," Stanford News, Sep. 9, 2014 (4 pages). Retrieved from https://news.stanford.edu/news/2014/september/ant-radio-arbabian-090914.html.

* cited by examiner

SYSTEMS AND METHODS OF VEHICULAR OPERATION

FIELD OF THE DISCLOSURE

The present disclosure relates to systems and methods of vehicular operation, and more particularly to systems and methods of emergency vehicle operation.

BACKGROUND

Emergency personnel routinely rely on emergency vehicles, such as ambulances, fire trucks, and police cars, to transport them to on-site emergencies on roadways often heavily trafficked with minimal inter-vehicle interaction. As a result, emergency vehicles are greatly slowed by having to avoid collisions with other vehicles while traffic clears a path for the emergency vehicle to pass.

Emergency services continue to demand improvements in emergency vehicle operation to reduce roadway inefficiencies, decrease transit time, and improve safety.

BRIEF DESCRIPTION OF THE DRAWINGS

Figures are illustrated by way of example and are not drawn to scale or intended to limit the scope of the disclosure.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

Unless otherwise defined, all technical and scientific terms used herein have the same meaning as commonly understood by one of ordinary skill in the art to which this disclosure belongs. The materials, methods, and examples are illustrative only and not intended to be limiting. To the extent not described herein, many details regarding specific materials and processing acts are conventional and may be found in textbooks and other sources within the vehicular and transportation arts.

In accordance with an aspect described herein, a method for vehicular operation on a road comprising a road network configured to communicate with one or more vehicles on the road can include sending a signal from a first vehicle to the road network, receiving the signal at the road network, and adjusting at least one of a speed and a path of a second vehicle in response to the signal. In an embodiment, the signal from the first vehicle can include an intended path of the first vehicle relative to the road. In a more particular embodiment, the signal can include a parametric curve representative of the intended path of travel of the first vehicle.

In an embodiment, the method can further include determining the intended path of the first vehicle. In a particular embodiment, determination of the intended path of the first vehicle can be made prior to sending the signal to the road network. In an embodiment, determining the intended path of the first vehicle can be performed by the first vehicle. In another embodiment, determining the intended path of the first vehicle can be performed by a logic device, such as one or more remote or local logic devices, in electronic communication with the first vehicle. The logic devices may comprise any computing device comprising one or more memories and processors.

In certain instances, the intended path of the first vehicle can be made with respect to the road, with respect to the second vehicle, or both. The intended path can include information relating to road lanes, distances between the first and second vehicle(s), or both. The information can include a discrete number of determined locations where the first vehicle will travel over a period of time or a continuous line of intended travel.

In an embodiment, the intended path of the first vehicle can be determined automatically. In another embodiment, the intended path of the first vehicle can be determined at least partially manually, such as by an occupant of the first vehicle or a remote party. In an embodiment, the signal from the first vehicle can be sent to the road network automatically. In another embodiment, the signal from the first vehicle can be sent to the road network at least partially manually, such as by an occupant of the first vehicle or a remote party.

In an embodiment, the second vehicle can include a plurality of vehicles disposed in front of the first vehicle, behind the first vehicle, to a lateral side of the first vehicle, or any combination thereof. In an embodiment, the plurality of vehicles can include at least two vehicles, at least three vehicles, at least five vehicles, at least 10 vehicles, or at least 100 vehicles. The second vehicle(s) can include truck(s), car(s), bus(es), and other readily known vehicle(s) occupying areas of the roadway. For clarity, and unless noted otherwise, reference made herein with respect to a singular second vehicle can refer to a plurality of second vehicles.

In an embodiment, the first vehicle can include an emergency vehicle—such as an ambulance, a fire truck, or a police car. In certain instances, the first vehicle can include a plurality of first vehicles, such as a plurality of first vehicles traveling together to an emergency location.

In certain instances, the road network can include a plurality of smart pavement patches, such as a first pavement patch in electronic communication with a second pavement patch. The pavement patches can communicate with one another to relay the signal from the first vehicle to the second vehicle.

A receiver coupled with the second vehicle can be adapted to receive the signal from the road network. In an embodiment, the second vehicle can adjust at least one of speed, path, or both in response to the received signal. In a particular instance, adjustment of at least one of the speed or path of the second vehicle can occur automatically. In another instance, adjustment of at least one of the speed or path of the second vehicle can occur manually.

Figure 1:
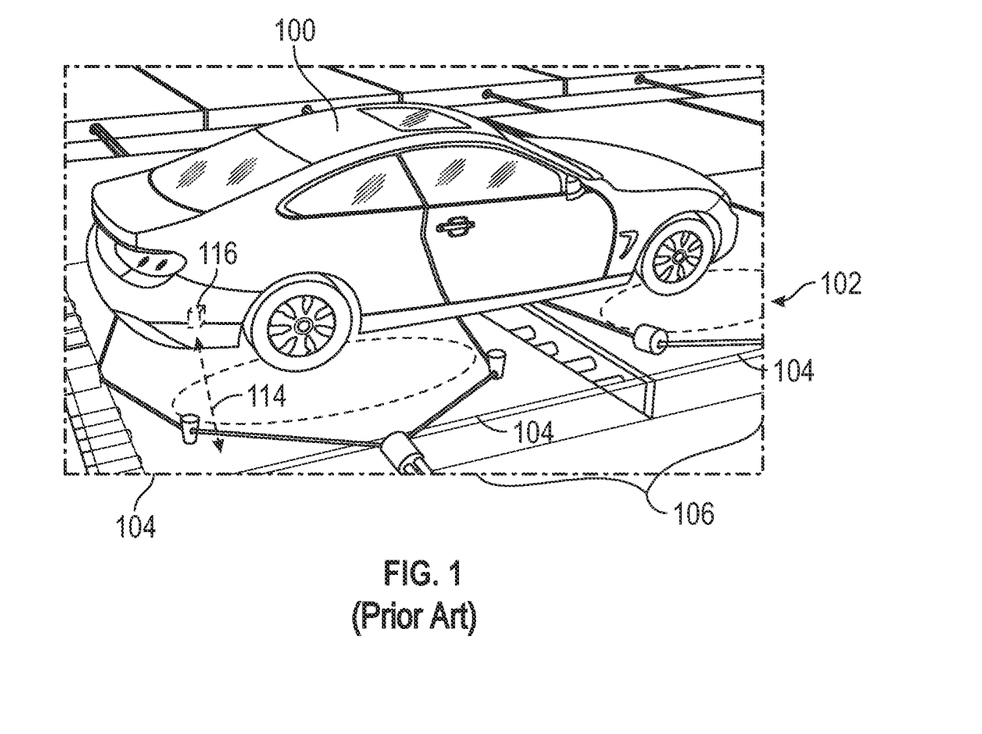
FIG. 1 depicts communication between a vehicle and a road network of a smart road in accordance with an embodiment.

FIG. 1 illustrates a vehicle 100 on a road 102 including a plurality of successively aligned pavement patches 104.

In an embodiment, at least two of the pavement patches 104 can have the same, or similar, dimensions as compared to one another—such as, for example, the same lengths ($L_{PP}$), the same widths ($W_{PP}$), or the same areas ($A_{PP}$). In an embodiment, the pavement patches 104 can include smart pavement patches. As used herein, "smart pavement patches" can refer to patches of the road 102 adapted to communicate information, such as information about one or more vehicles 100 disposed thereon, between themselves and other components, including the vehicles 100 disposed on the road 102. In certain instances, a plurality of smart pavement patches can be joined together to form a road network 106. The road network 106 can be adapted to receive signals from one or more vehicles 100. The road network 106 can relay the signals or instructions obtained from the signals to other vehicles 100 or equipment on the road 102. For example, the road network 106 may include a number of transmitters of the type disposed about each of the smart pavement patches for communicating with vehicles thereon. The transmitters may also communicate with other computing devices over a network, e.g., cellular, satellite, Wi-Fi, Bluetooth, near field communications, etc.

Figure 2:
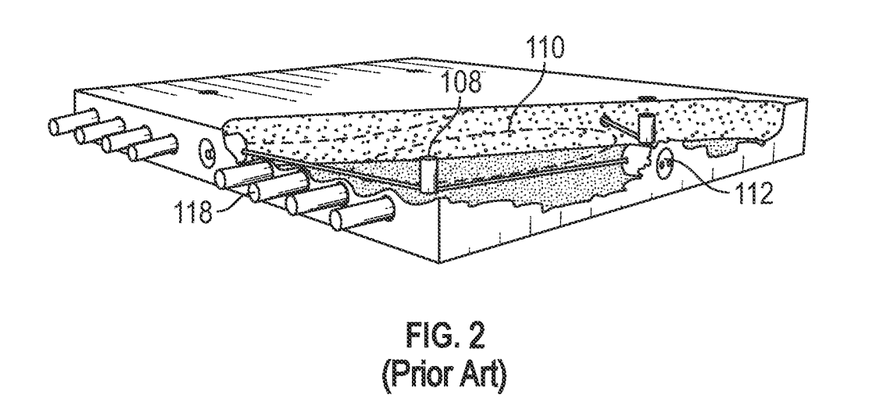
FIG. 2 depicts a partial cross-section of a pavement patch of a smart road in accordance with an embodiment.

Referring to FIG. 2, in an embodiment, at least one of the pavement patches 104 can include an access port 108. The access port 108 can house one or more sensors, processors, antennae, or other equipment for the road network 106. The access port 108 can be quickly accessed, for instance, during road maintenance and upkeep. In an embodiment, the access port 108 can also be used to engage with equipment during initial placement of the pavement patch 104.

In another embodiment, at least one of the pavement patches 104 can include a vehicle detection system 110. The vehicle detection system 110 can be adapted to detect the presence or location of one or more vehicle(s) 100 relative to the pavement patch 104. In a particular embodiment, the vehicle detection system 110 can include a fiber optic strain mesh laminated to the slab of the pavement patch 104. The fiber optic strain mesh can be adapted to detect the position of vehicle tires relative to the pavement patch 104.

In a further embodiment, at least one of the pavement patches 104 can include a router 112. The router 112 can be adapted to electronically interconnect the pavement patch 104 with one or more adjacent or nearby pavement patches 104, one or more remote or local data centers, or one or more vehicles 100 disposed on the road 102. In a particular embodiment, the pavement patch 104 can include four routers 112 connected to the slab of pavement on four opposite ends thereof. The routers 112 can send information between the pavement patches 104 to data centers disposed along the side of the road 102. In an embodiment, the routers 112 can further communicate with any one or more vehicles 100 in range. In a specific embodiment, the routers 112 can communicate 114 with one or more radios 116 (FIG. 1) on the vehicle 100 through antennae housed in the access port 108. In certain instances, the radios 116 can be powered by the vehicle 100. In an embodiment, the radios 116 can broadcast unique identifying information about the vehicle 100. That is, the vehicles 100 and the smart pavement patches 104 may communicate wirelessly with one another directly or over a network. Communication between radios disposed on vehicles and smart pavement can be conducted in any suitable matter.

In an embodiment, at least one of the pavement patches 104 can include a support system 118 adapted to interconnect adjacent pavement patches 104. The support system 118 can include a plurality of dowels receivable in conduits of an adjacent pavement patch 104. During assembly, the dowels of one pavement patch 104 can be installed in the conduits of an adjacent pavement patch 104. The volume between the dowels and conduits can be filled with a hardening material, such as grout, using one or more fill ports in the slab.

Figure 3:
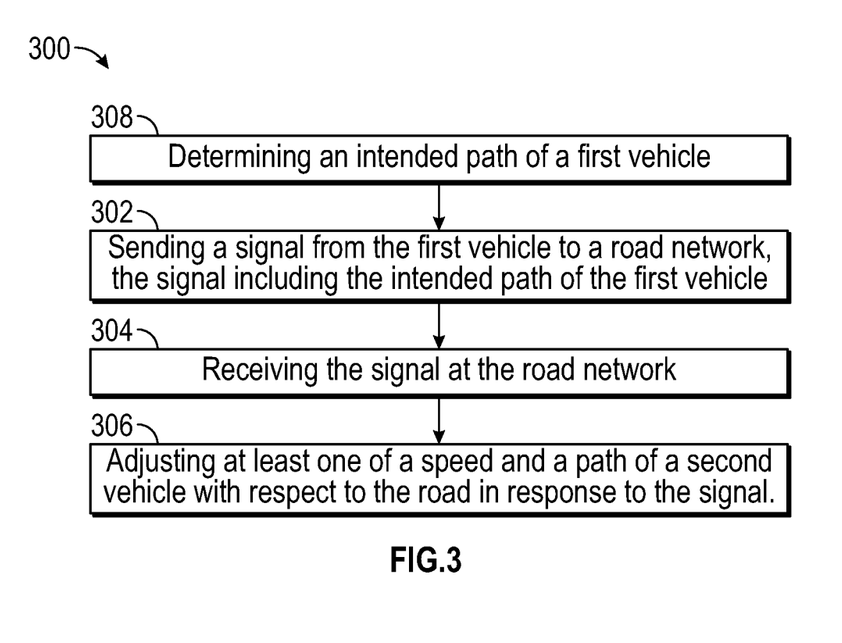
FIG. 3 depicts an illustrative flowchart depicting a method of vehicular operation in accordance with an embodiment.
Figure 4:
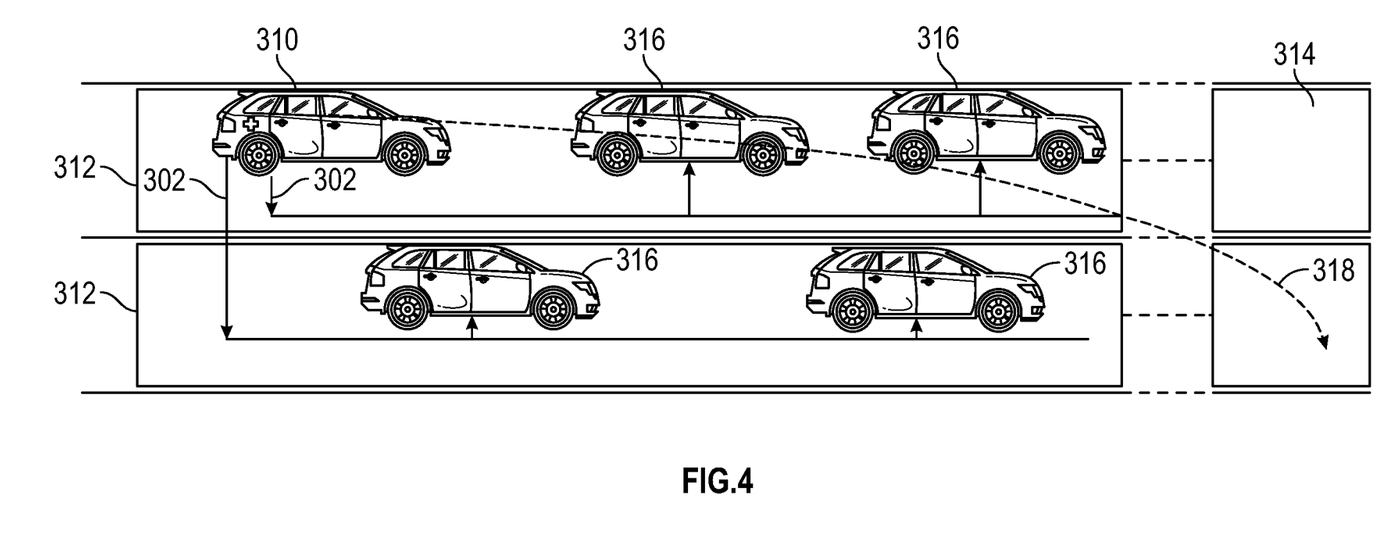
FIG. 4 depicts a method of vehicular operation in accordance with an embodiment.

FIGS. 3 and 4 illustrate a method 300 of vehicular operation in accordance with an embodiment. The method 300 can include sending a signal from a first vehicle 310 to a road network 312 (block 302). In this manner, the vehicles on the road may include transmitters for communicating with the road. The signal can include an intended path 318 of the first vehicle 310 on the road 314. In an embodiment, the method 300 further includes receiving the signal at the road network 312 (block 304). The method 300 can further include adjusting at least one of a speed and a path of one or more second vehicles 316 with respect to the road 314 in response to the signal (block 306).

In certain instances, adjusting the speed or path of the second vehicle 316 can be performed automatically. In other instances, adjusting the speed or path of the second vehicle 316 can be performed manually. For example, the driver of the second vehicle 316 can adjust the speed through a pedal or adjust a path through a steering wheel upon prompting by a human machine interface (HMI).

The method 300 can further include determining the intended path 318 of the first vehicle 310 (block 308). Such determination can be performed prior to sending the signal from the first vehicle 310 to the road network 312 (block 302). In an embodiment, the intended path 318 can be determined over a set range, such as within a distance of at least 1 mile from a current location of the first vehicle 310, at least 2 miles from the current location of the first vehicle 310, or at least 3 miles from the current location of the first vehicle 310. In such a manner, the second vehicle(s) 316 within proximity of the first vehicle 310 can be notified of the oncoming first vehicle 310, its intended path 318, instructions to avoid collision, or any combination thereof.

In an embodiment, information sent in the signal can include a multicast address containing data referencing the location of the second vehicles 316 with respect to the first vehicle 310. The multicast address can include, for instance, lane information, referred to as EVL+x (where EVL is short for "Emergency Vehicle Lane" and x is the number of lanes from the first vehicle 310); patch information, referred to as EVP+y (where EVP is short for "Emergency Vehicle Patch" and y is the number of patches from the first vehicle 310); or both.

Figure 5:
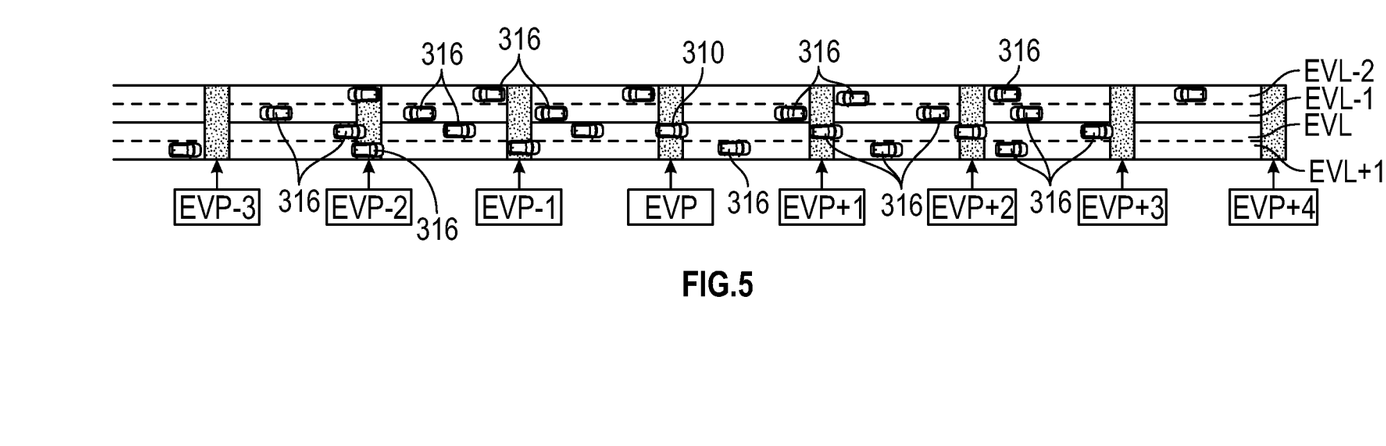
FIG. 5 depicts a schematic view of a road with vehicles in accordance with an embodiment.

Referring to FIG. 5, the first vehicle 310 is located at EVL and EVP. Second vehicles 316 in front of the first vehicle 310 are in EVP+1, EVP+2, EVP+3, etc., in view of their distance in front of the first vehicle 310 Similarly, second vehicles 316 behind the first vehicle 310 are in EVP−1, EVP−2, EVP−3, etc., in view of their distance behind the first vehicle 310. Moreover, second vehicles 316 in lanes to one side of the first vehicle 310 are in EVL+1, EVL+2, etc., in view of the number of lanes to EVL Similarly, second vehicles in lanes to the other side of the first vehicle 310 are in EVL−1, EVL−2, etc., in view of the number of lanes to EVL.

The road 314 can be adapted to receive a plurality of vehicles 100, such as a first vehicle 310 and one or more second vehicle(s) 316. Over time, the number of second vehicle(s) 316 located on the road 314, or their relative location with respect to a particular pavement patch 104, changes. In this manner, the road 314 can receive any suitable number of second vehicles 316. In some instances, the vehicles 316 are autonomous. In other instances, the vehicles 316 are driven by human drivers. In yet other instances, the vehicles 316 are a combination of autonomous vehicles and human drivers. The vehicles 316 may include one or more computing devices and transmitters for communicating with the road network 312.

In an embodiment, the first vehicle 310 can include an emergency vehicle, such as an ambulance, a fire truck, or a police car. The emergency vehicle 310 may be required to operate at elevated speeds and navigate roads 314 with one or more second vehicles 316. Traditionally, the use of a siren alerted nearby vehicles of the first vehicle's presence. To further reduce the likelihood of collision between the first and second vehicles 310 and 316 thereby increasing response time, the first vehicle 310 can send a signal to the second vehicle(s) 316 informing the second vehicle(s) 316 of the intended path 318 of the first vehicle 310.

Figure 6:
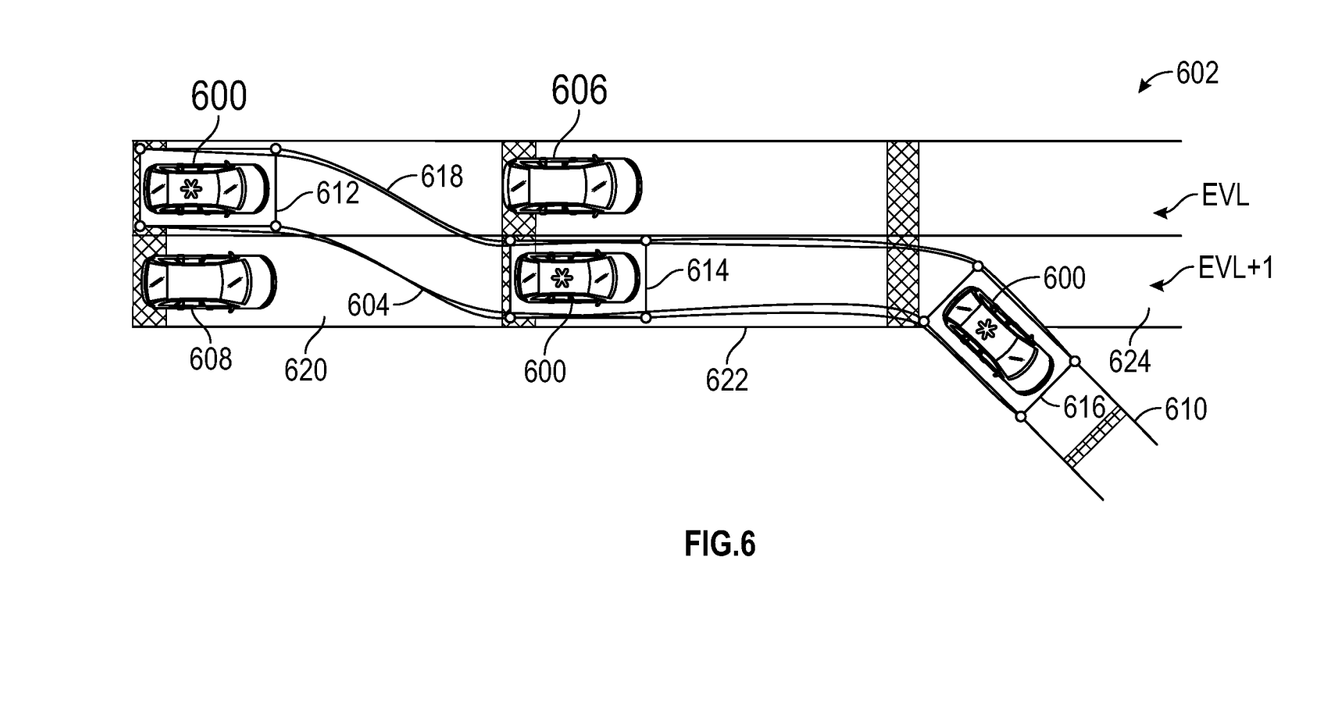
FIG. 6 depicts a schematic view of a road network with an emergency vehicle sending a signal of its intended path via the road network to a plurality of nearby vehicles and affecting at least one of their speed and path in accordance with an embodiment.

FIG. 6 illustrates an exemplary operation of a road network 602 in use. An emergency vehicle 600 traveling on the road network 602 determines an intended path 604. The intended path 604 can represent an anticipated travel speed of the emergency vehicle 600, an anticipated travel path of the emergency vehicle 600, or both. As illustrated, the intended path 604 begins in EVL before crossing into EVL+1 and reaching exit 610. This crossover can place the emergency vehicle 600 in a more suitable lane for exiting, to better avoid obstacles or second vehicle(s) 606, or both.

In certain instances, the intended path 604 of the emergency vehicle 600 can be determined from a series of projected locations to be occupied by the emergency vehicle 600 at future intervals. In an embodiment, these intervals are equally spaced apart from one another in time, distance, or both. For instance, FIG. 6 illustrates the emergency vehicle 600 at a first interval 612, a second interval 614, and a third interval 616. The first, second, and third intervals 612, 614, and 616 can be spaced apart by equal units of time or distance. The first, second, and third intervals 612, 614, and 616 can be connected together by a curve 618, one or more line segments, or a combination thereof to represent a continuous intended path 604. In an embodiment, the curve 618 of the intended path 604 can include a parametric curve. The curve 618 can define, for instance, a best fit line interconnecting the projected locations of the emergency vehicle 600 at the first, second, and third intervals 612, 614, and 616. In an embodiment, the curve 618 can be determined from at least two projected locations, at least three projected locations, at least five projected locations, at least 10 projected locations, at least 50 projected locations, at least 100 projected locations, or at least 1,000 projected locations. Any number of project locations may be used.

In an embodiment, the curve 618 can overlay a plurality of pavement patches, such as a first pavement patch 620, a second pavement patch 622, and a third pavement patch 624. In the illustrated embodiment, the first and second pavement patches 620 and 622 are occupied by second vehicles 606 and 608, respectively, and the third pavement patch 624 is vacant. The curve 618 can be determined in a manner so as to relocate the emergency vehicle 600 from EVL on the first pavement patch 620 to the exit 610 via EVL+1 on the first pavement patch 620, EVL+1 on the second pavement patch 622, and EVL+1 on the third pavement patch 624.

In an embodiment, the emergency vehicle 600 can send a signal to the other vehicles 606 and 608 after determining the intended path 604. The signal, or content thereof, can affect the speed or path of the other vehicles 606 and 608. The signal can be sent to the other vehicles 606 and 608 through the road network 602.

The other vehicles 606 and 608 can adjust at least one of a speed and a path thereof with respect to the road network 602 in response to the signal. In an embodiment, adjustment of the speed or the path can occur at least partially manually. For instance, the signal can instruct the human driver of the other vehicle 606 to remain in EVL and maintain current speed. The instruction can be generated by a human-machine interface (HMI). By way of a non-limiting example, the alert can include at least one of an auditory or a visual alert.

In another embodiment, adjustment of the speed or path of the other vehicle 608 can occur automatically. For instance, the signal can instruct the autonomous other vehicle 608 to reduce speed and remain in EVL+1 until overtaken by the emergency vehicle 600.

In an embodiment, the emergency vehicle 600 can broadcast the signal one or more discrete times. For example, the emergency vehicle 600 can broadcast the signal once and maintain, or generally maintain, the intended path 604. In another example, the emergency vehicle 600 can broadcast the signal a plurality of discrete times, such as at least two times, at least three times, or at least five times, etc. In certain embodiments, the intended path 604 can change between successive broadcasts. For instance, the intended path 604 may change with varying road conditions, newly encountered obstacles, unresponsive vehicle(s), changing route efficiencies, or any combination thereof. Each broadcast of the signal can reflect an updated intended path 604. In another instance, the intended path 604 can remain unchanged between successive broadcasts.

In another embodiment, the signal can be continuously broadcast from the emergency vehicle 600 through the road network 602. The intended path 604 can update or remain unchanged.

In this manner, signals may be sent to vehicles following the emergency vehicle, behind the emergency vehicle (e.g., immediately behind), in adjacent lanes to the emergency vehicle, or a combination thereof. Vehicles behind the emergency vehicle may need to maintain a safe gap between the emergency vehicle in front thereof. For example, the emergency vehicle may slow unexpectedly and the projected parametric curve may contain that information. In addition, if the emergency vehicle slows while switching lanes, vehicles in adjacent lanes behind the emergency vehicle may need the parametric curve to maintain a safe gap between the emergency vehicle.

Typical parametric equations used in kinematics, where the trajectory of an object is represented by equations, depend on time as a parameter. A vehicle receiving the parametric equations would compute the relative location of the emergency vehicle at a series of times in the future. A vehicle would observe (if time intervals are equally spaced) successive location points separated by diminishing distances when the emergency vehicle is decelerating. The opposite would be true if the emergency vehicle is accelerating. If the equations are analytic, a vehicle receiving the curves to compute higher order moments (e.g., velocity, acceleration, and jerk) can differentiate them. Following vehicles can anticipate when the emergency vehicle will decelerate based on the curves, and deaccelerate in time to avoid a collision. Leading vehicles can determine if the emergency vehicle is accelerating and speed up or switch lanes to avoid a conflict. In both situation, the likelihood of a collision is reduced between the emergency vehicles and other traffic.

In certain embodiments, traffic control devices, such as signal lights, crosswalks signals, etc., connected to the road network, can also use the parametric curves to change their timing and give the emergency vehicle priority at intersections (known as traffic signal preemption). For example, the road network may inform the traffic control devices, such as the crosswalk signals, with the intended path of the emergency vehicle. Based on this information, the crosswalk singles may prevent pedestrians from entering certain portions of the roadway in order to ensure that the emergency vehicle has a clear path. Similarly, the signals lights may turn red to prevent vehicles from entering the path of the emergency vehicles. Conversely, the signal lights may turn green in order to clear vehicles out of the path of the emergency vehicle.

Embodiments described herein can reduce the likelihood of accidents on roads during high-speed emergency vehicle operation. Embodiments described herein can reduce the transit time of emergency vehicles by warning nearby vehicles of impending passing and permitting adjustment of the speed or path of the nearby vehicles to clear the intended path of the first vehicle.

EXAMPLE EMBODIMENTS

In some instances, the following examples may be implemented together or separately by the systems and methods described herein.

Example 1 a method for vehicular operation on a road comprising a road network configured to communicate with one or more vehicles on the road, the method comprising: sending a signal from a first vehicle to the road network, the signal comprising an intended path of the first vehicle on the road; receiving the signal at the road network; and adjusting at least one of a speed and a path of a second vehicle with respect to the road in response to the signal.

Example 2 may include the method of example 1, further comprising: determining the intended path of the first vehicle prior to sending the signal.

Example 3 may include the method of example 2 and/or some other example herein, wherein determining the intended path of the first vehicle is performed by the first vehicle.

Example 4 may include the method of example 1 and/or some other example herein, wherein the signal comprises data corresponding to the intended path of the first vehicle with respect to the road, with respect to the second vehicle, or both.

Example 5 may include the method of example 1 and/or some other example herein, wherein the road network comprises a plurality of smart pavement patches.

Example 6 may include the method of example 1 and/or some other example herein, further comprising a receiver disposed in the second vehicle.

Example 7 may include the method of example 1 and/or some other example herein, wherein the second vehicle comprises a plurality of vehicles disposed in front of the first vehicle, behind the first vehicle, to a lateral side of the first vehicle, or any combination thereof.

Example 8 may include the method of example 1 and/or some other example herein, wherein sending the signal from the first vehicle is performed automatically by a logic device.

Example 9 may include the method of example 1 and/or some other example herein, wherein the first vehicle comprises an emergency vehicle.

Example 10 may include the method of example 1 and/or some other example herein, wherein the intended path of the first vehicle comprises a parametric curve.

Example 11 may include the method of example 1 and/or some other example herein, further comprising: receiving, by a traffic control device, the signal from the road network; and adjusting a parameter of the traffic control device with respect to the road in response to the signal.

Example 12 may include the method of example 1 and/or some other example herein, further comprising: receiving the signal from the road network at the second vehicle; and informing an occupant of the second vehicle of the intended path of the first vehicle.

Example 13 may include a method for emergency vehicle operation on a road comprising a road network, the method comprising: determining an intended path of an emergency vehicle on the road; sending a signal comprising the intended path of the emergency vehicle to a second vehicle via the road network; and adjusting at least one of a speed and a path of the second vehicle with respect to the road in response to the intended path of the emergency vehicle.

Example 14 may include the method of example 13, wherein at least one of determining the intended path of the emergency vehicle, sending the signal, and adjusting the at least one of the speed and the path of the second vehicle is performed automatically by a logic device.

Example 15 may include the method of example 13 and/or some other example herein, wherein determining the intended path of the emergency vehicle is performed for a distance of at least 1 mile from a current location of the emergency vehicle, at least 2 miles from the current location of the emergency vehicle, or at least 3 miles from the current location of the emergency vehicle.

Example 16 may include the method of example 13 and/or some other example herein, wherein the intended path of the emergency vehicle crosses between at least two lanes of the road.

Example 17 may include the method of example 13 and/or some other example herein, wherein adjusting at least one of the speed or the path of the second vehicle comprises adjusting at least one of the speed or the path of a plurality of second vehicles, and wherein the plurality of second vehicles include vehicles disposed in front of the emergency vehicle, behind the emergency vehicle, to a lateral side of the emergency vehicle, or any combination thereof.

Example 18 may include the method of example 13 and/or some other example herein, wherein sending the signal to the second vehicle is performed through a road network comprising a plurality of smart pavement patches.

Example 19 an emergency vehicle comprising: a logic device adapted to determine an intended path of the emergency vehicle on a road; and a signal transmitter adapted to send a signal including the intended path to a second vehicle via a road network, wherein the data includes a parametric curve associated with the intended path.

Example 20 may include the emergency vehicle of example 19, wherein the second vehicle comprises a signal receiver adapted to receive the signal from the road network and adjust at least one of a speed and a path of the second vehicle with respect to the road in response to the intended path of the emergency vehicle, and wherein the road network is adapted to transmit the signal from the emergency vehicle to the second vehicle.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all of the claims.

The specification and illustrations of the embodiments described herein are intended to provide a general understanding of the structure of the various embodiments. The specification and illustrations are not intended to serve as an exhaustive and comprehensive description of all of the elements and features of the apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, a logical substitution, or another change may be made without departing from the scope of the disclosure. Accordingly, the disclosure is to be regarded as illustrative rather than restrictive.

What is claimed is:

1. A method for vehicular operation on a road comprising a road network configured to communicate with one or more vehicles on the road, the method comprising:
   receiving a signal from a first vehicle at the road network, the signal comprising an intended path of the first vehicle on the road, wherein the road network comprises a plurality of smart pavement patches and a plurality of lanes, each smart pavement patch of the plurality of smart pavement patches extending across the plurality of lanes, and wherein each of the plurality of smart pavement patches further comprises:
      a transmitter configured to communicate with the first vehicle;
      an access port having at least one sensor;
      a vehicle detection system having a fiber optic strain mesh configured to detect a position of vehicle tires relative to the each of the plurality of smart pavement patches;
      a router configured to electronically interconnect the each of the plurality of smart pavement patches; and
      a support system having a plurality of dowels configured to interconnect the each of the plurality of smart pavement patches;
   assigning, to a second vehicle, a multicast address that indicates a location of the second vehicle relative to the first vehicle, wherein the multicast address comprises a lane identifier indicating a number of lanes between the second vehicle and the first vehicle and a smart pavement patch identifier indicating a number of smart pavement patches between the second vehicle and the first vehicle;
   determining, based on the signal from the first vehicle to the road network, that the intended path comprises at least one of a discrete number of determined locations where the first vehicle will travel over a period of time, wherein the intended path of the first vehicle comprises a crossover maneuver in which the first vehicle crosses at least one lane of the plurality of lanes based on the first vehicle detecting an obstacle, the crossover maneuver forming a parametric curve defining a best fit line interconnecting the discrete number of determined locations of the first vehicle and is relative to the road;
   determining, based on the intended path of the first vehicle on the road and the multicast address assigned to the second vehicle, a speed and a path of the second vehicle with respect to the road;
   adjusting, based on the intended path of the first vehicle on the road and through the road network, the speed and the path of the second vehicle with respect to the road, wherein adjusting the path of the second vehicle comprises increasing the number of lanes between the first vehicle and the second vehicle; and
   adjusting, based on the signal from the first vehicle to the road network and the intended path of the first vehicle on the road, a timing of a traffic control device with respect to the road.

2. The method of claim 1, wherein the signal comprises data corresponding to the intended path of the first vehicle with respect to the road, with respect to the second vehicle, or both.

3. The method of claim 1, further comprising a receiver disposed in the second vehicle.

4. The method of claim 1, wherein the second vehicle comprises a plurality of vehicles disposed in front of the first vehicle, behind the first vehicle, to a lateral side of the first vehicle, or any combination thereof.

5. The method of claim 1, wherein the first vehicle comprises a high-speed emergency vehicle.

6. The method of claim 1, further comprising sending a signal to the second vehicle to inform an occupant of the second vehicle of the intended path of the first vehicle.

7. The method of claim 6, wherein the each of the plurality of smart pavement patches further comprises four routers connected to four opposite ends of the each of the plurality of smart pavement patches.

8. A method for emergency vehicle operation on a road comprising a road network, the method comprising:
   receiving a signal from an emergency vehicle at the road network, the signal comprising an intended path of the emergency vehicle on the road, wherein the road network comprises a plurality of smart pavement patches and a plurality of lanes, each smart pavement patch of the plurality of smart pavement patches extending across the plurality of lanes, and wherein each of the plurality of smart pavement patches further comprises:
      a transmitter configured to communicate with the emergency vehicle;
      an access port having at least one sensor;
      a vehicle detection system having a fiber optic strain mesh configured to detect a position of vehicle tires relative to the each of the plurality of smart pavement patches;
      a router configured to electronically interconnect the each of the plurality of smart pavement patches; and
      a support system having a plurality of dowels configured to interconnect the each of the plurality of smart pavement patches;

assigning, to a second vehicle, a multicast address that indicates a location of the second vehicle relative to the first vehicle, wherein the multicast address comprises a lane identifier indicating a number of lanes between the second vehicle and the first vehicle and a smart pavement patch identifier indicating a number of smart pavement patches between the second vehicle and the first vehicle;

determining that the intended path comprises at least one of a discrete number of determined locations where the emergency vehicle will travel over a period of time, wherein the intended path of the first vehicle comprises a crossover maneuver in which the first vehicle crosses at least one lane of the plurality of lanes based determining a more suitable lane for exiting, the crossover maneuver forming a parametric curve defining a best fit line interconnecting the discrete number of determined locations of the first vehicle and is relative to the road;

providing the intended path of the emergency vehicle to a second vehicle via the road network;

determining, based on the multicast address assigned to the second vehicle, a speed and a path of the second vehicle with respect to the road in response to the intended path of the emergency vehicle;

adjusting, based on the intended path of the emergency vehicle on the road and through the road network, the speed and the path of the second vehicle with respect to the road; and adjusting, based on the signal from the emergency vehicle to the road network and the intended path of the emergency vehicle on the road, a timing of a traffic control device with respect to the road.

9. The method of claim 8, wherein determining the intended path of the emergency vehicle is performed for a distance of at least 1 mile from a current location of the emergency vehicle, at least 2 miles from the current location of the emergency vehicle, or at least 3 miles from the current location of the emergency vehicle.

10. The method of claim 8, wherein determining the speed or the path of the second vehicle comprises determining the speed or the path of a plurality of second vehicles, and wherein the plurality of second vehicles include vehicles disposed in front of the emergency vehicle, behind the emergency vehicle, to a lateral side of the emergency vehicle, or any combination thereof.

11. The method of claim 8, wherein the each of the plurality of smart pavement patches further comprises four routers connected to four opposite ends of the each of the plurality of smart pavement patches.

12. An emergency vehicle comprising:
a logic device adapted to determine an intended path of the emergency vehicle on a road, and to determine that the intended path comprises at least one of a discrete number of determined locations where the emergency vehicle will travel over a period of time or a continuous line of intended travel of the emergency vehicle, wherein the road comprises a plurality of smart pavement patches and a plurality of lanes, each smart pavement patch of the plurality of smart pavement patches extending across the plurality of lanes, and wherein each of the plurality of smart pavement patches further comprises:

a transmitter configured to communicate with the emergency vehicle;
an access port having at least one sensor;
a vehicle detection system having a fiber optic strain mesh configured to detect a position of vehicle tires relative to the each of the plurality of smart pavement patches;
a router configured to electronically interconnect the each of the plurality of smart pavement patches; and
a support system having a plurality of dowels configured to interconnect the each of the plurality of smart pavement patches;

a multicast address assigned to a second vehicle that indicates a location of the second vehicle relative to the first vehicle, wherein the multicast address comprises a lane identifier indicating a number of lanes between the second vehicle and the first vehicle and a smart pavement patch identifier indicating a number of smart pavement patches between the second vehicle and the first vehicle, wherein the logic device is further adapted to determine, based on the intended path of the emergency vehicle on the road and the multicast address assigned to the second vehicle, a speed and a path of the second vehicle with respect to the road; and a signal transmitter adapted to send a signal including data of the intended path to the second vehicle via a road network, wherein the data includes a parametric curve associated with the intended path, and wherein the speed and the path of the second vehicle with respect to the road is adjusted based on the intended path of the emergency vehicle on the road, wherein adjusting the path of the second vehicle comprises increasing the number of lanes between the emergency vehicle and the second vehicle, and wherein a timing of a traffic control device with respect to the road is adjusted based on the signal from the emergency vehicle to the road network and the intended path of the emergency vehicle on the road.

13. The emergency vehicle of claim 12, wherein the road network is adapted to transmit the signal from the emergency vehicle to the second vehicle.

14. The emergency vehicle of claim 12, wherein the signal comprises data corresponding to the intended path of the emergency vehicle with respect to the road, with respect to the second vehicle, or both.

15. The emergency vehicle of claim 12, wherein the second vehicle comprises a plurality of vehicles disposed in front of the emergency vehicle, behind the emergency vehicle, to a lateral side of the emergency vehicle, or any combination thereof.

16. The emergency vehicle of claim 12, further comprising an audio or visual device configured to receive the signal and to inform an occupant of the second vehicle of the intended path of the emergency vehicle.

17. The emergency vehicle of claim 12, wherein the each of the plurality of smart pavement patches further comprises four routers connected to four opposite ends of the each of the plurality of smart pavement patches.

\* \* \* \* \*